April 12, 1932.  E. V. FRANCIS  1,854,130
BARREL DUMPING DEVICE
Filed Dec. 23, 1929   2 Sheets-Sheet 1

Inventor,
Earle V. Francis
by Cushman Bryant & Darby
Attorneys

April 12, 1932.　　　　E. V. FRANCIS　　　　1,854,130
BARREL DUMPING DEVICE
Filed Dec. 23, 1929　　2 Sheets-Sheet 2

Inventor
Earle V. Francis
Cushman Byrant & Clarky
Attorneys

Patented Apr. 12, 1932

1,854,130

UNITED STATES PATENT OFFICE

EARLE V. FRANCIS, OF COLUMBUS, OHIO, ASSIGNOR TO THE JEFFREY MANUFACTURING COMPANY, OF COLUMBUS, OHIO, A CORPORATION OF OHIO

BARREL DUMPING DEVICE

Application filed December 23, 1929. Serial No. 416,188.

This invention relates to new and useful improvements in barrel dumping devices, particularly adapted to be employed for dumping barrels of material, the dust or fumes of which are very injurious to workmen.

An important object of the invention is to provide a mechanism for dumping these barrels which is controlled from a point remote from the point of discharging the material from the barrels; the device also including a barrel clamping mechanism, the control of which is similarly situated adjacent the control of the dumping mechanism.

Another important object of the invention is to provide a barrel receiving cradle of novel construction which is mounted on a three point suspension.

A further object of the invention is to provide a barrel receiving cradle into which the barrels may be freely rolled and automatically prevented from accidental displacement from the barrel receiving portion of such cradle.

A still further object of the invention is to provide means for retaining the barrels in fixed relation with respect to the cradle, so that they may be inverted to insure complete discharge of all of the material from the barrels.

Other objects and advantages of the invention will become apparent during the course of the following description.

In the drawings forming a part of the disclosure and wherein like numerals are employed to designate like parts throughout the several views.

Figures 1, 3, 5:
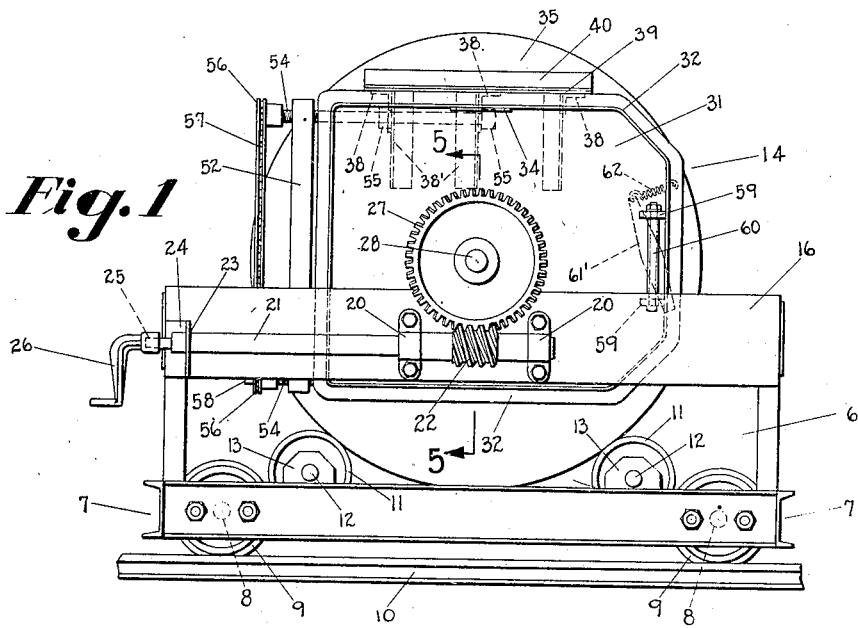
Figure 1 is a side elevation of the device with the cradle arranged in a horizontal plane to receive the barrel.
Figure 3 is an end elevation looking from the right side of Figure 1.
Figure 5 is an enlarged vertical section taken along the line 5—5 of Figure 1.

The barrel dumping device illustrated herein is particularly adapted for the handling of lead oxide, red lead and litharge, the dust of which from handling is essential to be excluded from the workmen to prevent injurious results, and for this purpose the device is rolled into dust tight housings for dumping the contents of the barrels. Although the device is particularly adaptable for this purpose, it is to be understood that its use is not restricted, as it can be used to advantage in other fields.

Referring now more specifically to the drawings, the barrel dumping device consists of a portable carriage 6 composed of a rectangular frame 7 constructed of side and end channel bars suitably connected together. Axles 8 extend transversely of this frame and carry track engaging wheels 9 which are adapted to rest upon and travel along suitable track rails 10. A pair of idler rollers 11 are mounted upon transverse shafts 12 supported in bearings 13 secured to the two side rails adjacent their ends for supporting a barrel receiving cradle indicated in its entirety by the numeral 14. It will be noted that the idler rollers 11 and track wheels 9 are mounted adjacent opposite ends of the frame 7 so that this frame will be open and form no obstruction to the passage of material discharged from the barrels. As will be noted in Figure 3, these idler rollers 11 are located at one side of the frame or carriage to form two points of support for the cradle 14.

The opposite side of the frame is provided with uprights 15 adjacent the ends of the frame, to the upper ends of which is secured a longitudinally extending plate 16, the upper edge of which is bent to provide an inwardly extending horizontal flange 17, as best seen in Figure 3, for a purpose which will later be described. These uprights 15 are suitably braced by angularly disposed braces 18 connected at their lower ends to the ends of the carriage frame, and at their upper ends by means of angle plates 19, to the upper ends of the uprights 15. To the outer face of the plate 16 adjacent its center are secured in spaced relation, a pair of horizontal bearings 20 for the support of a horizontal shaft 21 having a worm 22 formed thereon between the two bearings. This shaft 21 extends longitudinally of the frame to one end thereof to be mounted in a third bearing 23 formed by perforating the outwardly extending flange of a plate 24 secured to one of the uprights 15. The end of the shaft 21 projecting through the bearing 23 is squared as at 25, for the reception of a detachable crank 26, whereby the shaft can be manually operated.

The worm 22 is adapted to mesh with a worm wheel 27 keyed to the outer end of a horizontal stub shaft 28 extending through a bearing 29 secured to the horizontal flange 17, as shown to advantage in Figure 5. This stub shaft terminates at its inner end in a hub portion 30 which is bolted to the center of a vertically disposed plate 31 forming a part of the cradle 14. From the foregoing, it will be noted that the cradle 14 is provided with a three point support, one being the shaft 28 at one side of the cradle, and the other two being formed by the two idler rollers 11 at the opposite side thereof.

The barrel receiving cradle, which is tiltable on the axis 28, includes the plate 31 whose margins are surrounded by an angle frame 32 of the shape shown more clearly in Figure 1. In order to limit the turning movement of the cradle beyond the upright portions of a barrel 33, positioned therein, a plate 34 is secured to the angle frame 32 in position to abut the top of the frame flange 17 at either side of the axis 28 to retain the barrel up-ended or inverted to discharge. This angle frame 32 and plate 31 provide the cradle with a closed side, as is obvious.

The opposite side of the cradle is formed by a circular plate 35 having a ring 36 welded to its periphery as shown in Figure 3, with triangular web cleats 37 welded to the plate and ring to rigidify the structure. This ring is adapted to rest upon the two idler rollers 11 for support of this side of the cradle.

The two sides of the cradle are connected at its top by transversely extending angle bars 38, on top of which is secured a top plate 39 secured to the circular side plate 35 by an angle cleat 40.

Figure 2:
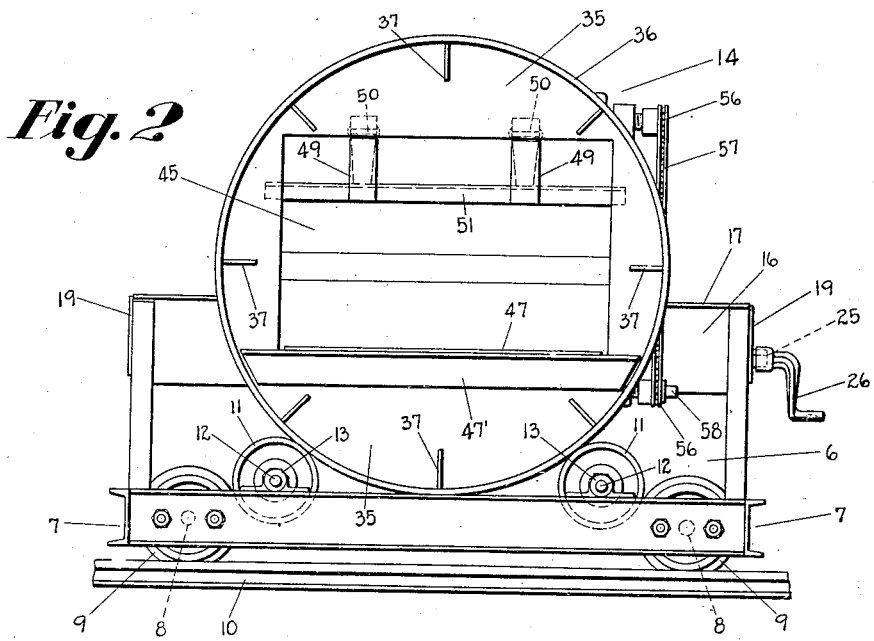
Figure 2 is a side elevation of the opposite side of the device in the same position.

The bottom of the cradle is formed by a plurality of transversely extending spaced angle bars 41 suitably connected to the front and rear plates 31 and 35 of the cradle frame, and are each equipped with a depressed central portion 42, an upwardly inclined portion 43 and a substantially horizontal portion 44 adjacent the circular plate 35. This circular plate 35 is provided with an enlarged substantially rectangular opening 45, as shown in Figure 2, for the passage of a barrel into and out of the cradle frame. The lower edge of this opening is on a level with the upper portions of the transverse angle bars 41 so that a bottom plate 46 secured to these bars and conforming to the shape thereof may extend out through the opening 45 a distance to form a horizontally projecting platform 47 upon which the barrels can be dumped when being rolled into the cradle. The outwardly projecting end of the plate 46 is given support by an angle bar 47' secured to the outer face of the circular plate 35 in any suitable manner. It will be noted that the central portion of this bottom plate 46 is depressed to conform to the portions 42 of the angle bars, while its innermost portion is inclined upwardly as at 48 to engage the side of the barrel 33 and cause it to roll back into its centralized seat in the bottom of the cradle.

Figure 4:
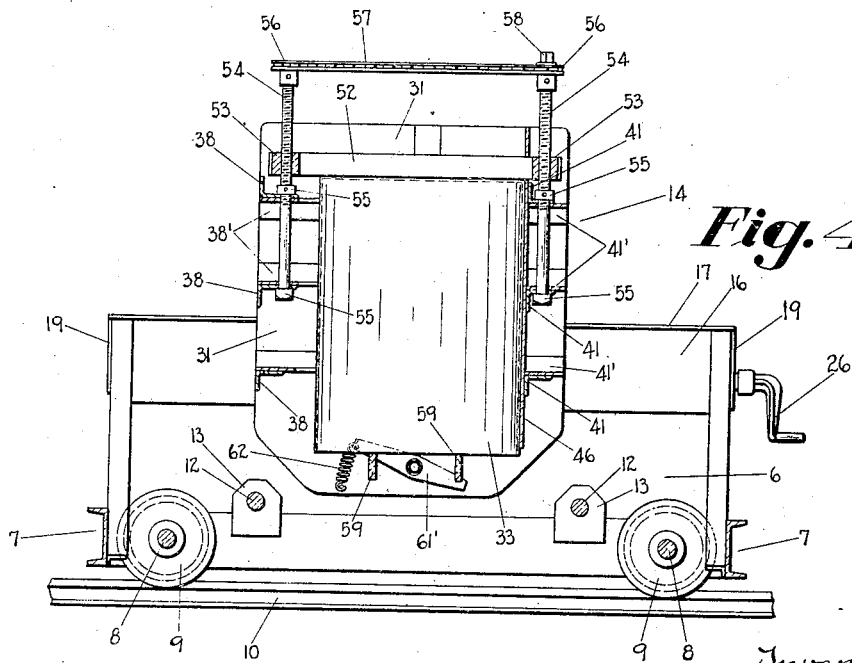
Figure 4 is a longitudinal sectional view similar to Figure 2 with the cradle and barrel in dumping position.

In order to prevent the barrel from rolling back out through the opening 45 before it has been clamped in place within the cradle, a guard plate or door 49 is hingedly connected at its upper end as at 50 to extend across the top of the opening or doorway 45. The lower edge of this guard 49 is provided with an angle bar 51 which projects laterally beyond the upright edges of the opening 45 as shown in Figure 2 to prevent the guard from swinging outwardly through this opening. After rolling a barrel into the cradle, it is necessary to support the same in substantially fixed relation thereto, so that it can be upended to remove its dust-proof cover and inverted to discharge material therefrom. For this purpose, the bottom of the barrel 33 is adapted to be engaged by a pair of spaced parallel bars 52 connected at their ends by transverse nut bearing blocks 53 which are threadedly associated with screw shafts 54 mounted in openings in the upper and lower transverse angle bars 38 and 41, as best shown in Figure 4. If desired, web plates 38' may be secured to the angle bars 38 and front face plate 31 to rigidify the structure, while the transverse webs 41' may be secured to the angle bars 41 and to both front and rear plates 31 and 35. The screw shafts 54 are provided with suitable abutments 55 for engagement with their respective angle bars to prevent longitudinal displacement thereof. The outer end of each screw shaft is equipped with a sprocket 56 over which is trained an endless sprocket chain 57 for imparting simultaneous rotation thereto by rotation of either. One of the screw shafts 54 terminates in a squared end 58 for the reception of the crank 26.

The opposite or cover end of the barrel is adapted to be engaged by a pair of spaced parallel bars 59 arranged at right angles to the clamping bars 52 and are held in spaced parallel relation by spacing sleeves 60 arranged at opposite ends thereof. The inner ends of the bars 59 are adapted to be supported upon supports formed by spaced lugs 61 carried by the plate 35, while the opposite ends of these bars are adapted to slide through apertures in the front face plate 31. These bars are prevented from accidental longitudinal movement outwardly of the cradle by means of a swinging detent 61' pivoted between its ends to the front face plate 31 at a point between the bars 59 so as to take into notches in these bars under compulsion of a coil spring 62 secured to one end of the detent and to the face plate.

From the foregoing description, it will be seen that after a barrel 33 is rolled onto the platform 47 and into the opening or doorway 45, the barrel will engage the guard plate 49, causing it to swing inwardly until the barrel moves into the cradle sufficiently to permit the guard to swing back by gravity across the doorway and exclude the possibility of the barrel rolling out of the cradle. The bars 52 are then moved by rotation of the screw shafts 54 up into engagement with the bottom of the barrel, thereby moving it longitudinally up to the bars 59 at the cover end of the barrel. A slight distance between these bars 59 and the top of the barrel is allowed, however, so that when the shaft 21 is rotated to swing the cradle and upend the barrel, the bars 59 can be slid outwardly of the cradle giving access to the cover of the barrel for its removal. When in this position, it will be noted that the abutment 34 on the cradle will engage the inturned flange 17 of the carriage to retain the barrel in upended position during removal of the cover. After removal of this cover, the bars 59 are slid inwardly of the cradle so that their inner ends find support on the lugs 61 and the detent 61' automatically snaps into the notches of these bars impelled by the coil spring 62. These bars are by this action locked in place, and the shaft 21 can be rotated in the opposite direction by the crank 26 to invert the barrel to cause its contents to be discharged through its opening and down through the open framework of the carriage frame into a suitable hopper beneath the track. When in this inverted position, it will be seen that the abutment 34 of the cradle engages the inturned flange 17 at the opposite side of the axis 28 to prevent the cradle being turned beyond a position which inverts the barrel. All of this is performed in a dust-tight casing by an operator manipulating the crank 26 on the shaft 21 and screw shafts 54 through suitable apertures in the dust-tight housing. After a barrel has been dumped, it can be brought to a horizontal position by manipulating the shaft 28 and will be retained therein by reason of the worm drive until the carriage is moved out of the dust-tight casing and the guard 49 raised to permit the barrel to be removed vertically of the carriage by hoist or other suitable means after releasing the clamping bars 52.

It is to be understood that various changes in the size, shape and arrangement of parts may be resorted to without departing from the spirit of the invention or the scope of the appended claims.

I claim:—

1. A barrel dumping device comprising a support, a tilting cradle having a barrel receiving passage, and guard means normally extending over said passage to prevent displacement of a barrel but operable by contact with said barrel to permit entrance of the same into said cradle.

2. A barrel dumping device comprising a support, a tilting cradle having a barrel receiving passage, and an inwardly swinging door normally closing said passage to prevent displacement of a barrel but operable by contact with said barrel to permit entrance of the same into said cradle.

3. A barrel dumping device comprising a support, a tilting cradle having a barrel receiving portion, and barrel end engaging means slidable transversely of said barrel receiving portion, and a detent carried by the cradle and engaging said means for preventing accidental sliding movement thereof.

4. A barrel dumping device comprising a support, a tilting cradle having a barrel receiving portion and a bar support, a barrel engaging bar slidably mounted in said cradle and having one end removably supported on said bar support, and a detent engaging said bar for preventing its accidental sliding movement.

5. A barrel dumping device comprising a support, a tilting cradle having a barrel receiving portion and a bar support, a pair of barrel engaging bars slidably mounted in said cradle and having their ends removably supported on said bar support, and a detent pivotally mounted between its ends and normally engaged with said pair of bars.

6. A barrel dumping device comprising a cradle frame having a pair of side members, a bottom plate extending from one member to the other and having a concavity therein forming a barrel receiving seat, a portion of said plate being extended from said concavity in upwardly inclined relation to a side member to provide an abutment for preventing the barrel from overrunning said concavity, and means associated with the cradle for clamping a barrel therein upon said barrel receiving seat.

7. A barrel dumping device comprising a support, a tilting cradle including side members and a connecting bottom forming a barrel receiving seat, one of said side members being circular, a pair of rollers carried by the support for supporting engagement with the periphery of said circular plate for supporting one side of the cradle, the other side member having a stub shaft secured thereto, and a bearing for said shaft carried by the support for supporting the other side of said cradle.

8. A barrel dumping device comprising a cradle frame having a pair of side members, a bottom plate extending from one member to the other and having a concavity therein forming a barrel receiving seat, a portion of said plate being extended from said concavity in upwardly inclined relation to a side member to provide an abutment for preventing the barrel from overrunning said concavity, and means engaging opposite ends of the barrel to secure the same in the barrel receiving seat, one of said means being movable longitudinally of the barrel and the other being movable transversely thereof.

9. A barrel dumping device comprising a cradle frame having a pair of side members, a bottom plate extending from one member to the other and having a concavity therein forming a barrel receiving seat, a portion of said plate being extended from said concavity in upwardly inclined relation to a side member to provide an abutment for preventing the barrel from overrunning said concavity, and barrel end engaging means slidable transversely of said barrel receiving seat associated with the cradle for clamping a barrel therein.

10. A barrel dumping device comprising a cradle frame having a pair of side members, a bottom plate extending from one member to the other and having a concavity therein forming a barrel receiving seat, a portion of said plate being extended from said concavity in upwardly inclined relation to a side member to provide an abutment for preventing the barrel from overrunning said concavity, and barrel end engaging bars movable longitudinally and translationally of said barrel receiving seat associated with the cradle for clamping a barrel therein.

11. A barrel dumping device comprising a cradle frame having a pair of side members, a bottom plate extending from one member to the other and having a concavity therein forming a barrel receiving seat, a portion of said plate being extended from said concavity in upwardly inclined relation to a side member to provide an abutment for preventing the barrel from overrunning said concavity, a pair of screw shafts carried by said cradle, a barrel engaging end bar having screw connection with said shafts, and means for simultaneously operating the shafts.

12. A barrel dumping device comprising a cradle frame having a pair of side members, a bottom plate extending from one member to the other and having a concavity therein forming a barrel receiving seat, a portion of said plate being extended from said concavity in upwardly inclined relation to a side member to provide an abutment for preventing the barrel from overrunning said concavity, a pair of screw shafts carried by said cradle, a barrel engaging end bar having screw connection with said shafts, said shafts being provided with sprockets and interconnected by a chain for simultaneous operation.

In testimony whereof I have hereunto set my hand.

EARLE V. FRANCIS.